(12) United States Patent
Shi et al.

(10) Patent No.: US 9,331,589 B2
(45) Date of Patent: May 3, 2016

(54) PRIMARY FEEDBACK SWITCHING POWER CONVERTER CONTROLLER WITH INTELLIGENT DETERMINATION OF AND RESPONSE TO OUTPUT VOLTAGE DROPS DUE TO DYNAMIC LOAD CONDITIONS

(71) Applicant: Dialog Semiconductor Inc., Campbell, CA (US)

(72) Inventors: Fuqiang Shi, Oak Park, IL (US); Yong Li, San Jose, CA (US); Mengfei Liu, Milpitas, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 110 days.

(21) Appl. No.: 14/033,719

(22) Filed: Sep. 23, 2013

(65) Prior Publication Data
US 2014/0085938 A1    Mar. 27, 2014

Related U.S. Application Data

(60) Provisional application No. 61/704,865, filed on Sep. 24, 2012.

(51) Int. Cl.
*H02M 3/335*    (2006.01)
*H02M 1/00*    (2006.01)

(52) U.S. Cl.
CPC .. *H02M 3/33523* (2013.01); *H02M 2001/0019* (2013.01)

(58) Field of Classification Search
CPC ............... H02M 3/33507; H02M 3/33523; H02M 2001/0019
USPC ............... 363/20, 21.01, 21.04, 21.05, 21.07, 363/21.08, 21.09, 21.1, 21.12, 21.13, 21.15, 363/21.16, 21.17, 21.18, 49, 97
See application file for complete search history.

(56) References Cited

U.S. PATENT DOCUMENTS

| | | | |
|---|---|---|---|
| 4,774,649 A * | 9/1988 | Archer | 363/20 |
| 8,897,038 B2 * | 11/2014 | Li | 363/21.16 |
| 2007/0217230 A1 * | 9/2007 | Charles | 363/20 |
| 2012/0176820 A1 * | 7/2012 | Li | H02M 3/33507 363/21.12 |
| 2013/0016535 A1 * | 1/2013 | Berghegger | 363/21.15 |
| 2013/0250627 A1 * | 9/2013 | Herfurth | H02M 3/3376 363/21.15 |

* cited by examiner

*Primary Examiner* — Adolf Berhane
*Assistant Examiner* — Alex Torres-Rivera
(74) *Attorney, Agent, or Firm* — Fenwick & West LLP

(57) ABSTRACT

The embodiments herein include a primary-side controller for a switching power converter that is capable of receiving a detection signal from a secondary-side detection circuit indicating that an output voltage has reached a condition. The controller determines the appropriate action once a detection signal has been received by distinguishing whether a dynamic load condition has been placed on the power supply versus other operating conditions.

20 Claims, 11 Drawing Sheets

PRIMARY FEEDBACK SWITCHING POWER CONVERTER CONTROLLER WITH INTELLIGENT DETERMINATION OF AND RESPONSE TO OUTPUT VOLTAGE DROPS DUE TO DYNAMIC LOAD CONDITIONS

CROSS-REFERENCE TO RELATED APPLICATIONS

This application claims the benefit under 35 U.S.C. §119 (e) from U.S. Provisional Patent Application No. 61/704,865 filed Sep. 24, 2012, which is incorporated by reference in its entirety.

BACKGROUND

1. Technical Field

The embodiments disclosed herein relate to a power supply, and more particularly, to a flyback type switching power converter having a primary-side controller capable of responding to a detected drop in secondary voltage caused by a dynamic load change.

2. Description of the Related Arts

Pulse width modulation (PWM) and pulse frequency modulation (PFM) are conventional technologies used for controlling switching power converters to achieve output power regulation. This includes regulation for constant voltage and constant current output regulation. Conventional flyback power converters include a power stage for delivering electrical power from a power source to a load, a transformer in the power stage coupled between the power source and the load, a switch in the power stage that is coupled in series with the primary winding of the transformer, and a switch controller coupled to the switch for controlling the on-time and off-time of the switch using a control signal at an operating frequency of the switching power converter. The on-time and off-time of the switch can be modified by this controller based upon a feedback signal representing the output power, output voltage or output current. The energy from the power source is stored in the gap of the transformer when the switch is on and is transferred to the load when the switch is off. Regulation can be accomplished by, among other things, measuring the output current (or voltage) and providing the measured output current or voltage back to the primary side controller, which modifies the on-time and off-time of the switch accordingly.

In order to improve cost performance and reduce overall size, many commercially available isolated power supplies employ primary-only feedback and control. By sensing primary side signals during each "ON" and "OFF" cycle, the secondary output and load condition can be detected and thus be adequately controlled and regulated. This includes both constant voltage and constant current modes of operation. Furthermore, many electronic devices require the power supply to provide a controlled and regulated power source over wide operating conditions, adding to the difficulty of primary-side sensing and control. Portable devices such as smartphones and tablet computers are examples of such devices.

FIG. 1 illustrates a typical operating curve of the power supplies used to provide a controlled and regulated power source to these types of devices. There are three major operating conditions that are presented to the power supply. Two operating conditions occur while the electronic device is connected to the power supply. In the first operating condition, Constant Voltage Mode (CVM) 101, the power supply is required to supply a regulated DC output of a fixed voltage within a certain tolerance as shown by CVM range 104. CVM 101 generally indicates that the internal battery of the electronic device is fully charged and the fixed voltage output of the power supply provides the operating power for the electronic device to be operated normally.

In Constant Current Mode (CCM) 102, the power supply is required to provide a fixed current output. CCM 102 generally indicates that the internal battery of the electronic device is not fully charged and the constant current output of the power supply allows for the efficient charging of the internal battery of the electronic device. While operating in the CCM, the power supply is required to supply a regulated DC output of a fixed current within a certain tolerance as shown by CCM range 105. The third operating condition, No-Load 103, is when the electronic device is disconnected from the power supply. In No-load 103, the power supply is required to maintain a regulated voltage output in anticipation of the electronic device being re-connected to the power supply.

Because of convenience, it is common for end users to leave the power supply connected to the AC mains at times. Because it is necessary to maintain a regulated output voltage even in no-load conditions, a dual-mode control methodology is commonly employed. During the period when there is a nominal load, pulse width modulation is employed. When the load approaches no load, it is difficult to maintain a PWM duty-cycle low enough to maintain output regulation. A pre-load, or dummy load can be added, however, operational efficiency and no-load power consumption would be negatively impacted. Furthermore, because the power supplies are connected to the AC-mains even during long periods of time when they are not connected to the electronic device, government and environmental agencies have placed maximum limits on the no-load power consumption.

In these conditions, a common technique is for the controller to switch from PWM to PFM. Under no-load conditions, the rate of pulses driving the switch in the power stage is decreased significantly in order to maintain output voltage regulation, resulting in long periods of time between "ON" and "OFF" cycles. This presents a significant challenge to primary-side sensing control schemes that rely on the "ON" and "OFF" cycle to obtain a feedback signal. During the periods between "ON" time and "OFF" time, the status of the output voltage is unknown by the controller as there is no feedback signal available. Especially concerning is the event that the electronic device is reconnected to the power supply, representing a dynamic load change, during these long periods where the primary-side control is unaware of the state of the secondary output voltage. The dynamic load response in this case would be poor, causing the output voltage to drop accordingly. This may cause the undesired affect of the output voltage exceeding the regulation specifications.

FIG. 2 illustrates a conventional flyback power supply 200 with controller 201 employing primary-only feedback. Controller 201 has a feedback pin FB to obtain the secondary voltage 203 information reflected on the auxiliary winding 204, and controller 201 senses the reflected waveform from auxiliary winding 204 to obtain the voltage level of output 203. In order to maintain regulation of output 203 under light and no-load conditions, controller 201 may employ PFM and reduce the operating frequency of the drive signal 206 that controls the turn-on and turn-off of switch SW. Since controller 201 samples the reflected waveform in order to determine the output voltage level of output 203 during each "ON" and "OFF" cycle to sample, the reduction in operating frequency results in long periods of time when the output voltage is not monitored by controller 201. A sudden increase in load during these unmonitored periods causes a drop in the voltage of output 203 exceeding the regulation specifications.

FIG. 3 illustrates the associated waveforms of the power converter of FIG. 2. At time T_0 the operating frequency of the gate drive control signal 206 defined by controller 201 is reduced to a minimum Freq_Op_(MIN) in response to the output load at no-load (0 Amps) while the output voltage (V_OUT) is maintained at the regulated output V_REG. This operating mode is commonly referred to as "skip-mode". At time T_1, the output load is dynamically increased to 100% rated load, causing the output voltage (V_OUT) to decline. However, since there is a long period before the next "ON" and "OFF" cycle, there is a long delay before controller 201 detects the drop in the output voltage. At time T_2, controller 201 initiates an "ON" and "OFF" cycle, at which time controller 201 detects the drop in the output voltage (V_OUT) and responds by increasing the operating frequency and/or "ON" time of the switch SW to respond to the increase in load. However, the long delay in detecting the increase in load may cause the output voltage to drop below the regulation limits V_REGULATION_MIN as shown in FIG. 3.

SUMMARY

The embodiments herein include a primary-side controller for a switching power converter that is capable of receiving a detection signal from a secondary-side detection circuit indicating a dynamic load condition where an output voltage has reached a voltage set by a detection reference voltage. The controller is capable of determining the appropriate action once a detection signal has been received by distinguishing whether a dynamic load condition has been placed on the power supply as opposed to other operating conditions. Other conditions including but not limited to "start-up" and constant current mode (CCM) operation. Once it has been determined that a dynamic load condition is present, the controller defines "ON" and "OFF" cycles in order to rapidly respond to the sudden change in load, resulting in superior load regulation.

The embodiments herein include a switching power converter comprising: a transformer coupled between an input and an output of the switching power converter, the transformer including a primary winding coupled to the input to receive an input voltage and a secondary winding coupled to the output of the switching power converter; a switch coupled to the primary winding of the transformer, current through the primary winding being generated while the switch is turned on and not being generated while the switch is turned off; a controller at a primary winding side of the transformer and configured to generate a control signal to turn on or turn off the switch, the switch being turned on responsive to the control signal being in a first state and the switch being turned off responsive to the control signal being in a second state; a feedback circuit at the primary winding side of the transformer and configured to generate a feedback signal indicative of an output voltage at the output of the switching power converter; a load detection circuit at a secondary winding side of the transformer and separate from the feedback circuit, the load detection circuit configured to generate a detection signal responsive to the output voltage reaching a condition; and wherein the controller is configured to receive the detection signal and determine whether the output voltage reached the condition due to a dynamic load condition occurring when a load is connected to the output of the switching power converter or another condition other than the dynamic load condition.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
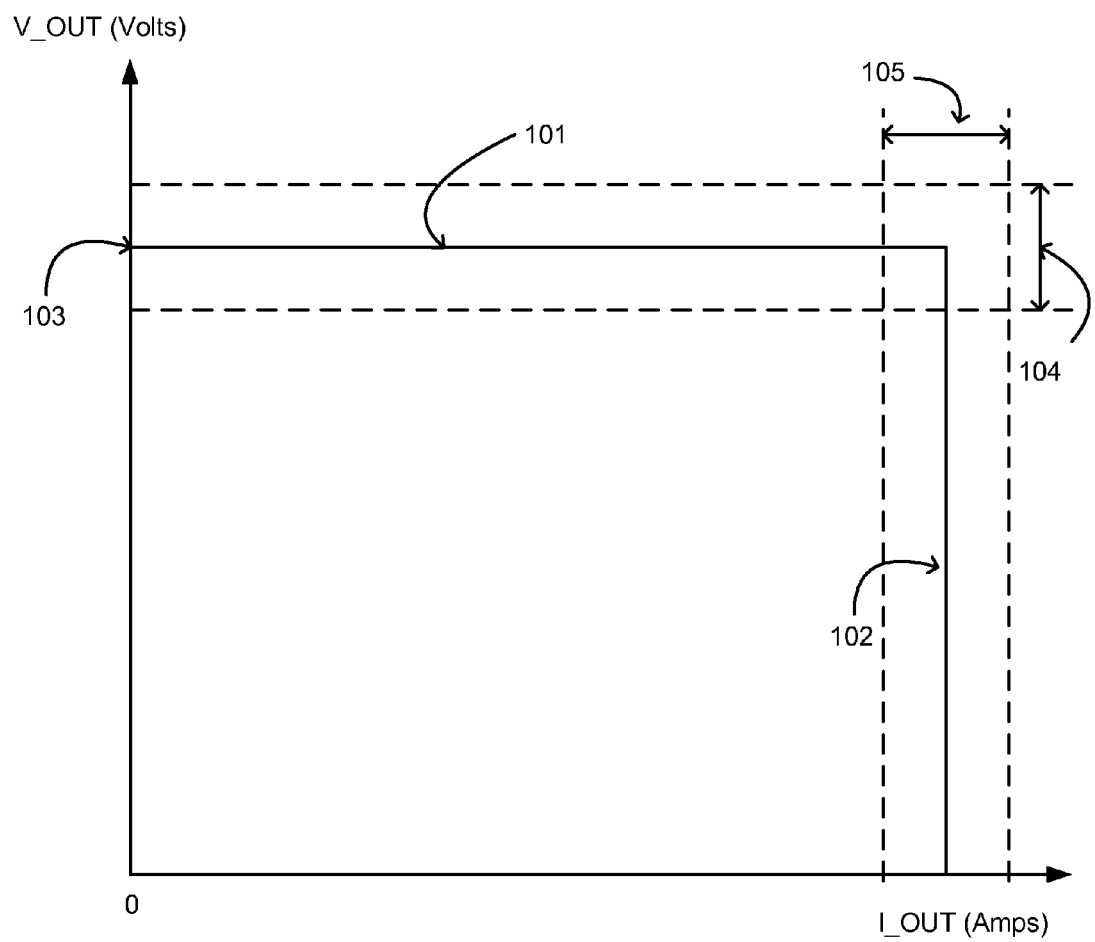
FIG. 1 illustrates an operating curve of a conventional switching power converter.
Figure 2:
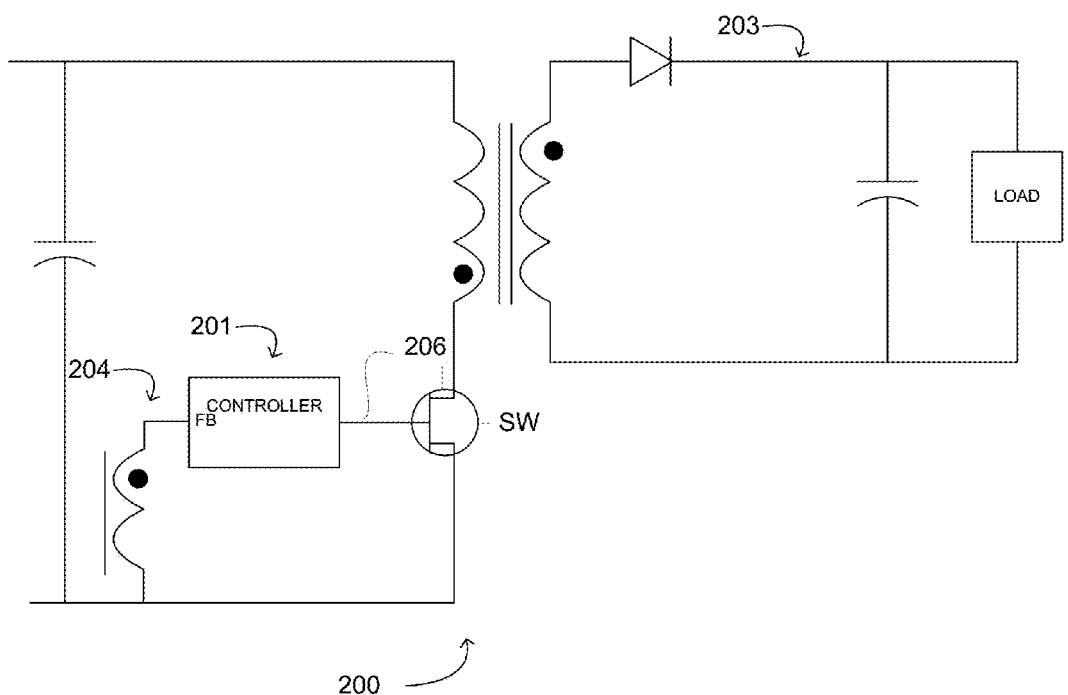
FIG. 2 illustrates a conventional switching power converter with primary-only feedback.
Figure 3:
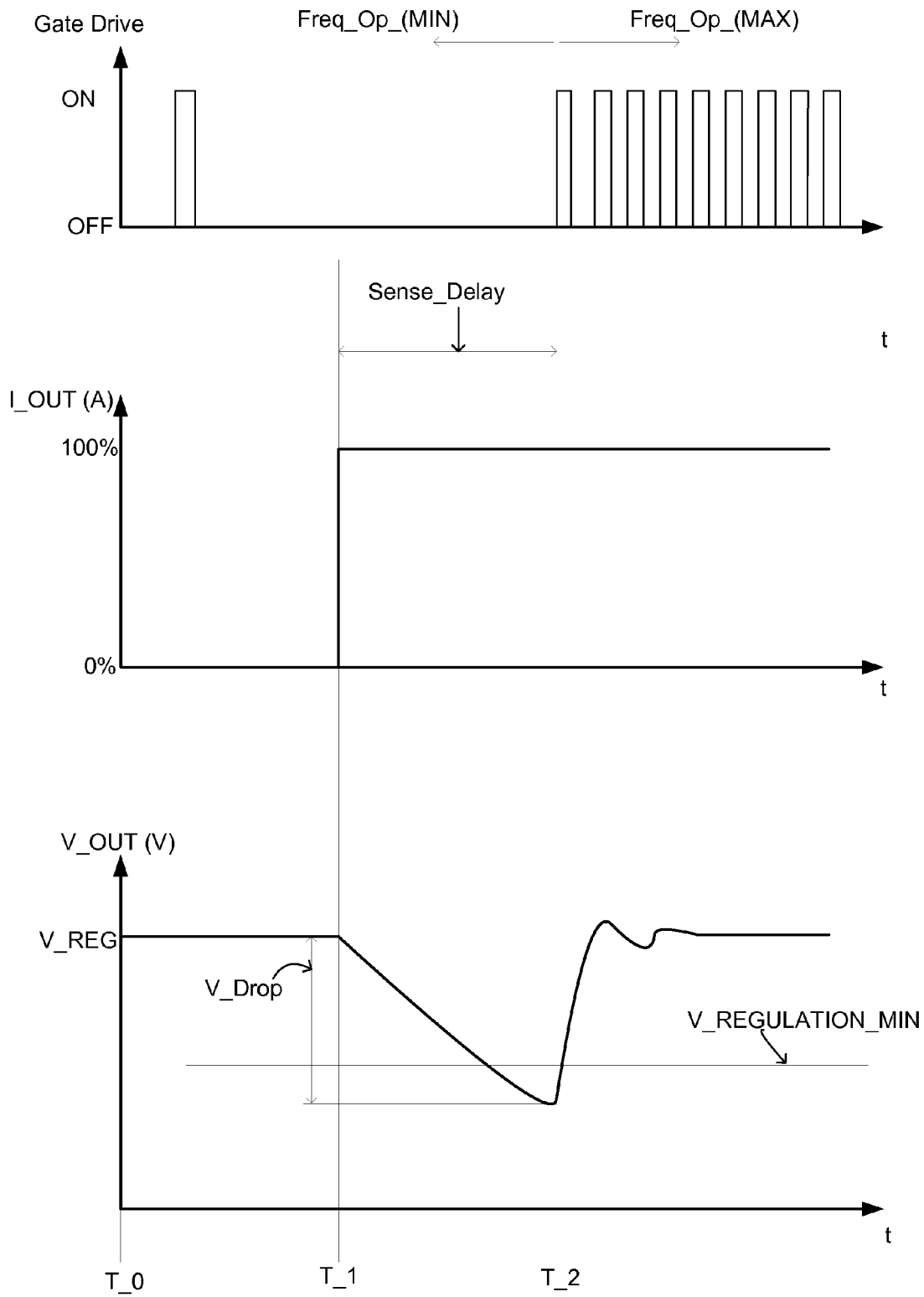
FIG. 3 illustrates the operating waveforms of a conventional switching power converter with primary-only feedback.
Figure 4:
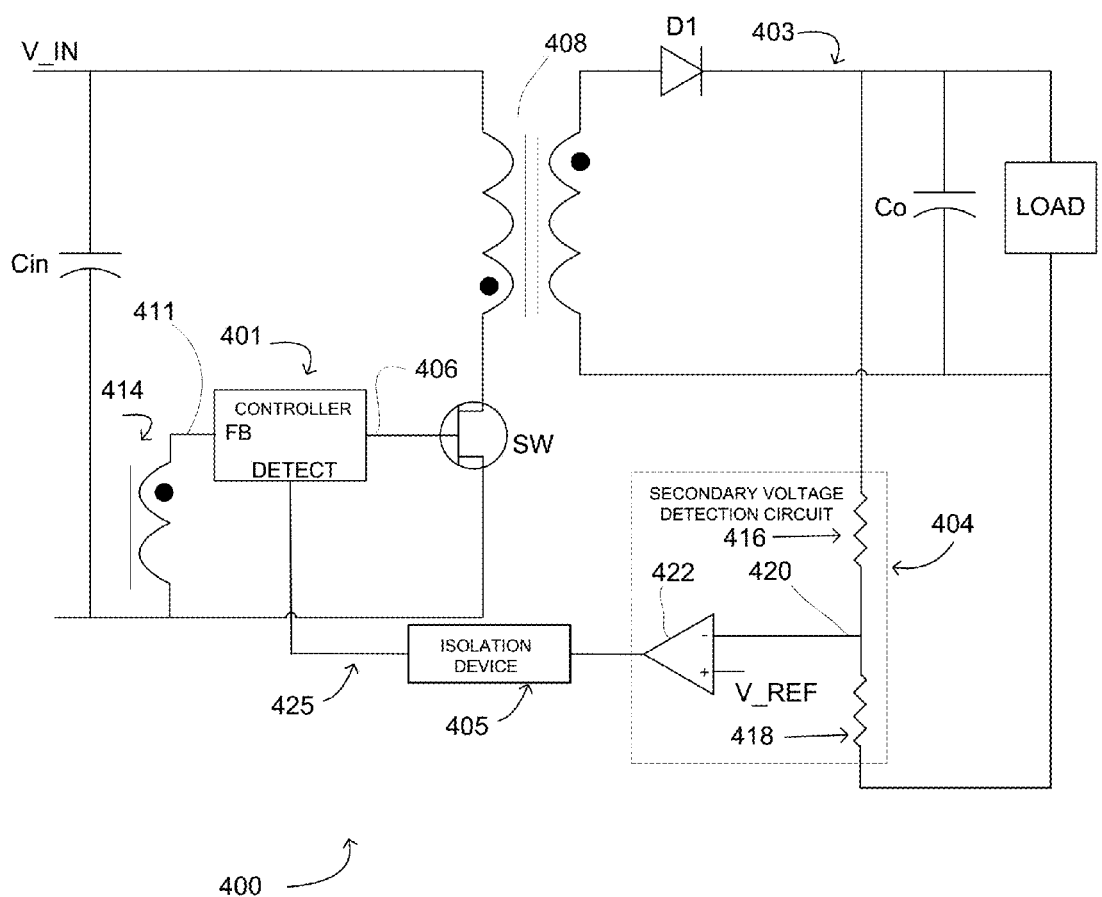
FIG. 4 illustrates a switching power converter circuit according to one embodiment.

Embodiments herein include a primary-side controller for a switching power converter that is capable of receiving a detection signal from a secondary-side detection circuit indicating that an output voltage has reached a condition such as a voltage set by a detection reference voltage. The controller determines the appropriate action once a detection signal has been received by distinguishing whether a dynamic load condition has been placed on the power supply versus other operating conditions. Other conditions include, but are not limited to, "start-up" when the switching power converter is powering on and constant current mode (CCM) operation. Once it has been determined that a dynamic load condition is present, the controller defines "ON" and "OFF" cycles of the switching power converter in order to rapidly respond to the sudden change in load, resulting in superior load regulation. Turning to the figures, FIG. 4 illustrates a primary-side fly-back power converter 400 according to one embodiment. As shown in FIG. 4, the power converter 400 includes a switch SW. In one embodiment, the switch SW is a MOSFET. However, the switch SW may be any type of switching device such as a bipolar junction transistor (BJT).

The fly-back power converter 400 includes a primary-side controller 401. Primary-side controller 401 provides the drive signal 406 which defines the "ON" and "OFF" cycles of power switch SW based on a primary-only feedback signal 411 input to the FB pin of controller 401. The primary-side controller 401 generates the drive signal 406 at the operating frequency of the switching power converter 400 and regulates the output voltage 403 across a load LOAD coupled to the output of the switching power converter 400 based on a primary-side feedback signal 411. The primary-side feedback is received through an auxiliary winding 408 of transformer 408. The auxiliary winding 414 provides a feedback signal representative of output voltage on the secondary winding of transformer T1 to the feedback pin FB of the controller 401.

AC power is received from an AC power source (not shown) and is rectified to provide the regulated DC input voltage V_IN across input capacitor Cin. The input power is stored in transformer 408 while the switch SW is turned on during the "ON" cycles because the diode D1 becomes reverse biased. The rectified AC input power is then transferred to the load LOAD across the capacitor Co while the switch SW is turned off during the "OFF" cycles because the diode D1 becomes forward biased. Diode D1 functions as an output rectifier and capacitor Co functions as an output filter. Controller 401 can employ any one of a number of well-known modulation techniques, such as pulse-width-modulation (PWM) or pulse-frequency-modulation (PFM), to control the ON and OFF states and duty cycles of power switch SW.

A secondary voltage detection circuit 404 coupled to the output of the switching power converter 400 directly senses output 403 via a voltage divider comprised of resistors 416, 418. Note the voltage 420 from the voltage divider in the secondary voltage detection circuit 404 is input to the negative terminal of the comparator 422. When the output voltage 403 drops and thus the divided voltage 420 drops below the reference voltage V_REF, the comparator 422 output is placed into the ON state, and a detection signal 425 is generated and transmitted via isolation device 405 to the DETECT pin of controller 401. In one embodiment, the isolation device 405 is an opto-coupler (i.e., an opto-isolator) that is in the low state under normal operating conditions. The opto-coupler is placed in the on state when a condition (e.g., a drop in the output voltage) is detected resulting in the opto-coupler generating the detection signal 425. In other embodiments, other coupling devices may be used such as a capacitor or a coupling transformer. Once controller 401 receives the detection signal 425 (e.g., when output voltage 403 drops to a level set by reference voltage V_REF), the controller 401 has the ability to determine the cause and take the appropriate actions to maintain the voltage at output 403. Controller 401 is able to determine if the cause is a dynamic load being placed on output 403 or result of other operational conditions because controller 401 is in control of the operation modes of the switching power converter 400.

Figure 5:
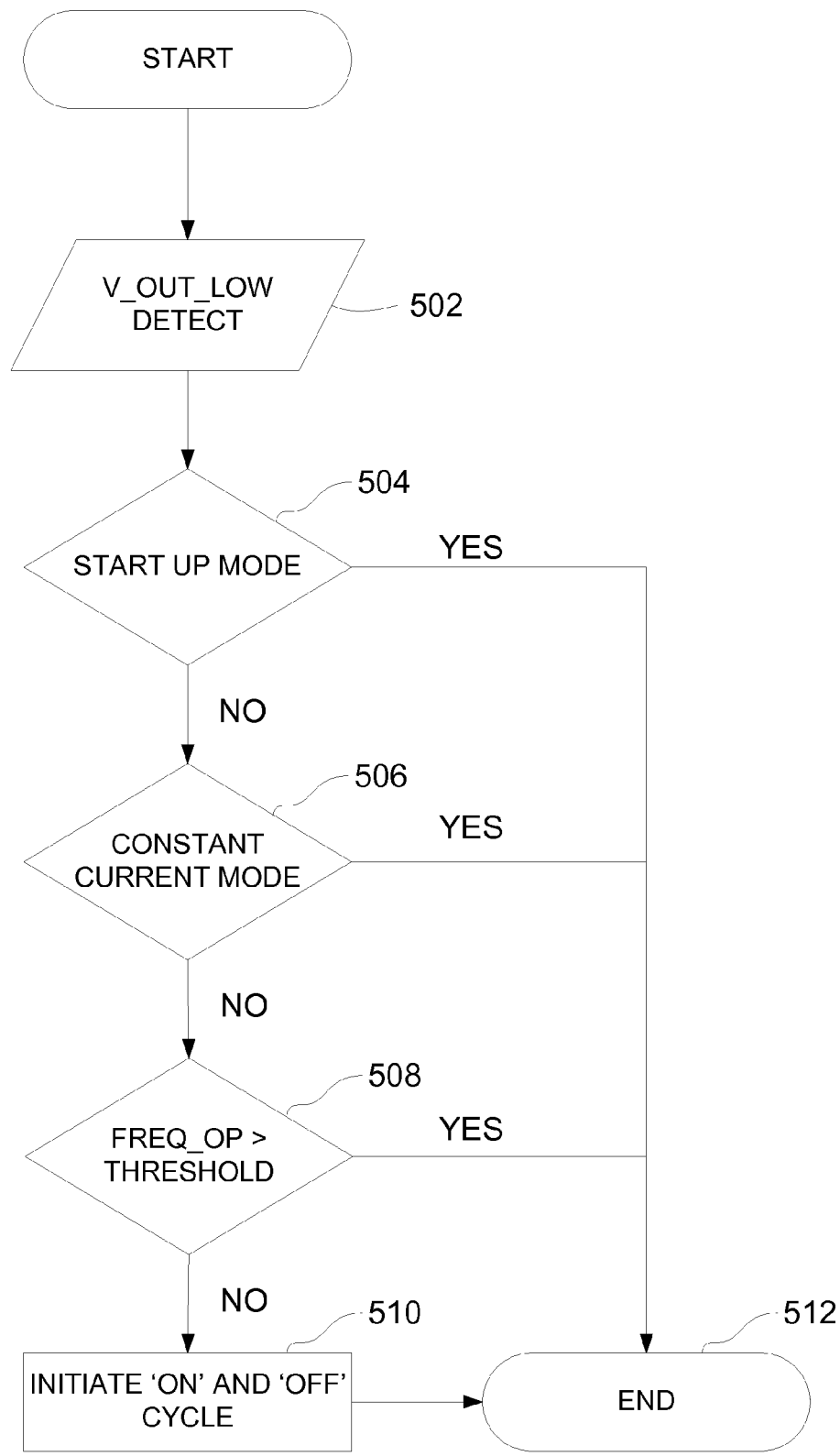
FIG. 5 is a flow diagram illustrating the operation of a primary-side controller of a switching power converter according to one embodiment.

FIG. 5 is a flow diagram illustrating one embodiment of the process in which controller 401 takes the appropriate action in response to receiving a detection signal 425 from secondary voltage detection circuit 404. Once a detection signal 425 has been received in step 502, controller 401 determines whether switching power converter 400 is operating in either the start-up mode (step 504) or in the constant current mode (CCM) (step 506) at the time the detection signal 425 is received. Controller 401 is capable of determining its operation mode because controller 401 is in control of selecting the operation mode in which the power converter 400 is to operate. The controller 401 determines what mode it is operating in as the output voltage may purposely vary in a particular mode thereby resulting in the generation of the detection signal 425. If it has been determined that power supply 400 is operating in either the start-up mode (step 504) or the CCM (step 506), controller 401 disregards the detection signal 425 received from secondary voltage detection circuit 404 and the process ends 512. Once controller 401 has determined that power supply 400 is in neither the start-up mode (step 504) nor CCM (step 506), controller 401 determines if the power supply 400 is either in a no-load or light load condition in step 508 by checking the switching frequency in which the controller 401 had been using. No-load or light load operating conditions presents situation where the power supply is most vulnerable to dynamic load conditions due to the long periods between "ON" and "OFF" cycles. If power supply 400 is operating above a minimum operating frequency threshold in step 508, no special action is taken because the frequency of primary-side feedback signals is sufficient to provide normal response by the control loop, and the process ends 512. If the operating frequency of power supply 400 is below a minimum operating frequency in step 508, the controller 401 concludes that power supply 400 is operating in a no-load or light load condition and that output 503 voltage is in decline. At this point, controller 401 initiates 510 an "ON" and "OFF" cycle earlier than typically warranted by the no-load or light load condition in order to obtain a feedback signal representative of the output voltage 403. For the initial "ON" and "OFF" cycle, controller 401 may define a minimum energy cycle in order to prevent voltage overshoot. Termed a "sense-pulse," it provides the minimum energy transferred from the primary side to the secondary side of the power converter 400 while prompting a reliable feedback signal 411. Thus, the controller 401 advantageously distinguishes the dynamic load condition from other conditions such as CCM, start up mode, or no-load/light load conditions and takes the appropriate action when a dynamic load condition occurs. Furthermore, with the control loop and loop gain stability based on the primary-only feedback signal 411, the bandwidth of the secondary voltage detection circuit 404 may be maximized without negatively impacting control loop stability based on the primary-only feedback signal 411. This allows for the rapid response by controller 401 when a dynamic load condition has been detected.

Figure 6:
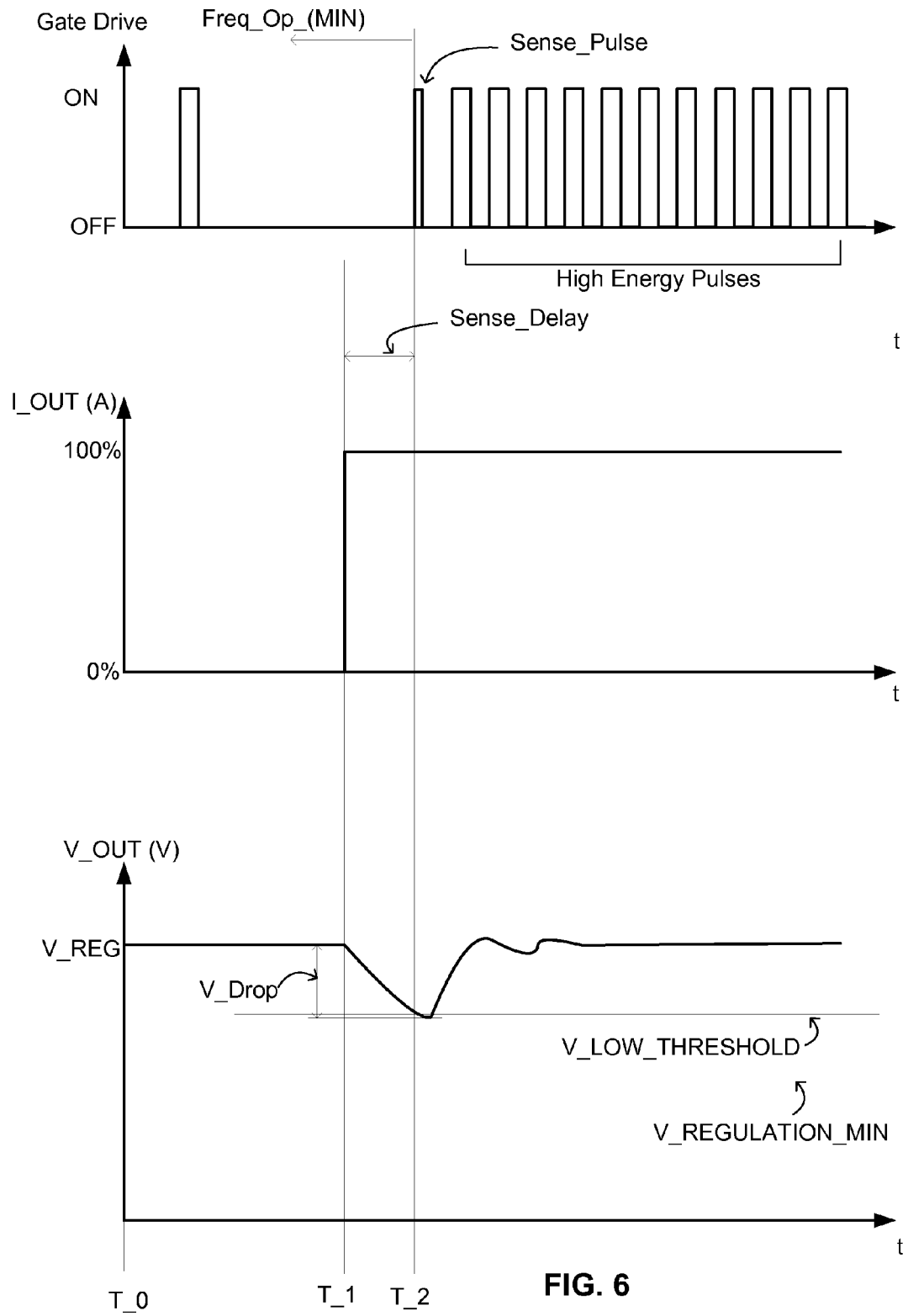
FIG. 6 illustrates the operating waveforms of a switching power converter with primary-side feedback according to one embodiment.

FIG. 6 illustrates the resulting operational waveforms where a power supply 400 is operating in a no-load condition at time T_0. At time T_1, a dynamic load from 0% to 100% rated load is placed on power supply 400. The dynamic load causes a drop in output voltage V_OUT 403 until it triggers the low voltage threshold (V_LOW_THRESHOLD) established by reference voltage V_REF. Secondary voltage detection circuit 404 generates a low voltage detection signal 425, which is received by controller 401. Once controller 401 determines that power supply 400 is operating in the constant voltage mode and that it is operating in a no-load or light load condition in step 508 (FIG. 5), at time T_2 the controller 401 initiates a sense pulse in order to obtain a feedback signal representative of output 403. Based on the feedback signal 411 obtained from the sense pulse, controller 401 determines that the load has indeed increased and controller initiates subsequent "ON" and "OFF" cycles necessary to maintain proper output voltage regulation as shown in FIG. 6.

Figure 7A:
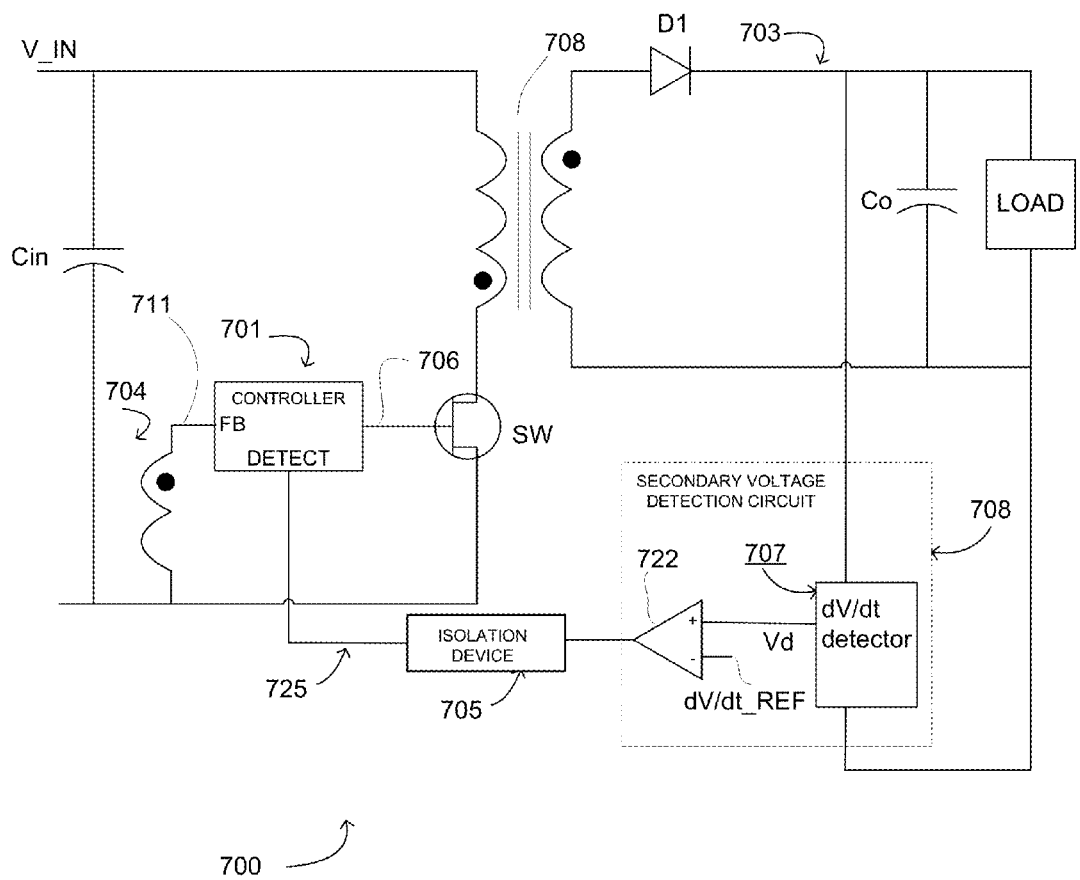
FIG. 7A illustrates a switching power converter according to another embodiment.

FIG. 7A illustrates a primary-side fly-back power converter 700 according to another embodiment. The fly-back power converter 700 includes similar features as the fly-back power converter 400 such as a primary-side controller 701, switch SW, transformer 708, auxiliary winding 704, input capacitor Cin, diode D1, output capacitor Co, isolation device 705, and output 703.

Primary-side controller 701 provides the drive signal 706 which defines the "ON" and "OFF" cycles of the power converter 700 based on a primary-only feedback signal 711. The primary-only feedback signal 711 is input to the FB pin of controller 701. The secondary voltage detection circuit 708 directly senses output voltage 703. In one embodiment, secondary voltage detection circuit 708 detects the rate of change of output voltage 703 using a dV/dt detector circuit 706 and a reference voltage dV/dt_REF, which will be explained in more detail below with reference to FIGS. 7B and 7C. When a rate of decrease (dV/dt) of the output voltage 703 exceeds the dV/dt threshold, as determined by dV/dt reference voltage dV/dt_REF, the comparator 722 output is placed into the ON state, and a detection signal 725 is generated and transmitted via isolation device 705 to the DETECT pin of controller 701. Once controller 701 has received a detection signal, it determines the cause and takes appropriate actions to maintain the output voltage 703. Controller 701 is able to determine if the cause is a dynamic load being placed on output 703 or result of other operational conditions.

Figure 7C:
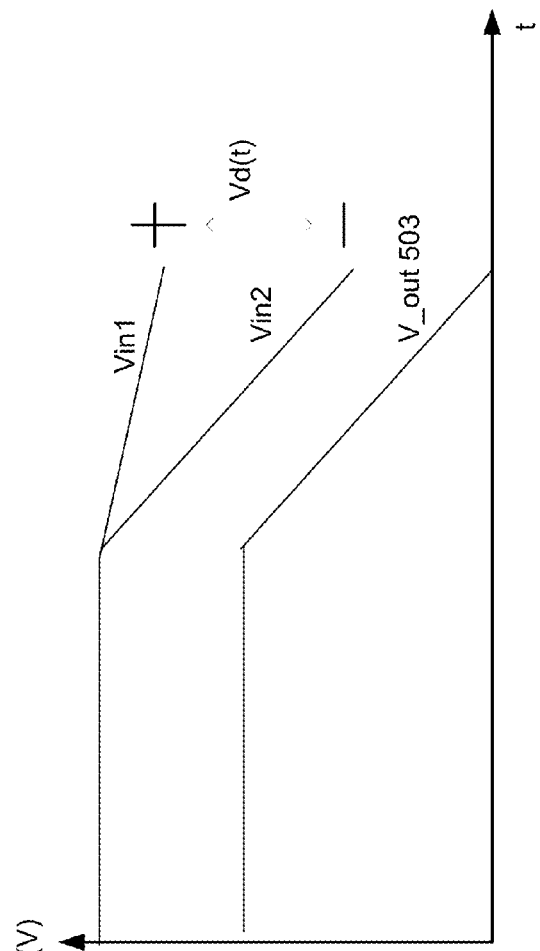
FIGS. 7B and 7C illustrate the dV/dt detector circuit of the switching power converter of FIG. 7A in more detail, according to one embodiment.
Figure 7B:
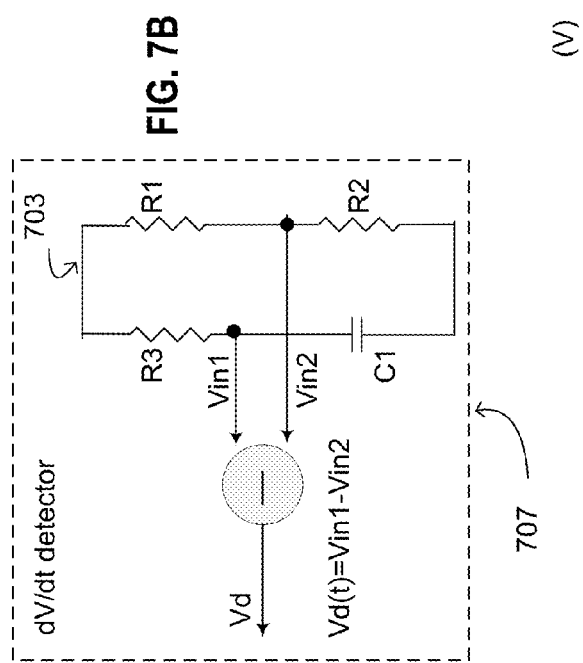

FIGS. 7B and 7C illustrate an example of the dV/dt detector circuit of the switching power converter of FIG. 7A in more detail, according to one embodiment. When a drop in the output voltage occurs 703, the detector 707 outputs a voltage Vd based on a difference between component voltages Vin1 and Vin2. Vin1 decreases slower according to an RC time constant of the detector 706 defined by resistor R3 and capacitor C1 while Vin2 decreases faster with the output voltage 703 according to a voltage divider output including resistances R1 and R2. The difference Vd of Vin1 and Vin 2 describes the rate of change (dV/dt) of regulated output 703. The comparator 722 compares Vd with reference voltage dV/dt_REF (FIG. 7A). dV/dt_REF sets the threshold determining if a dynamic load condition is present. Once Vd exceeds dV/dt_REF and thus a dynamic load condition is detected, isolation device 705 generates and transmits an alert signal for the controller 701 on the DETECT pin of controller 701. Accordingly, isolation device 705 is placed in the ON state when a rapid drop in the output voltage 703 is detected.

Figure 8:
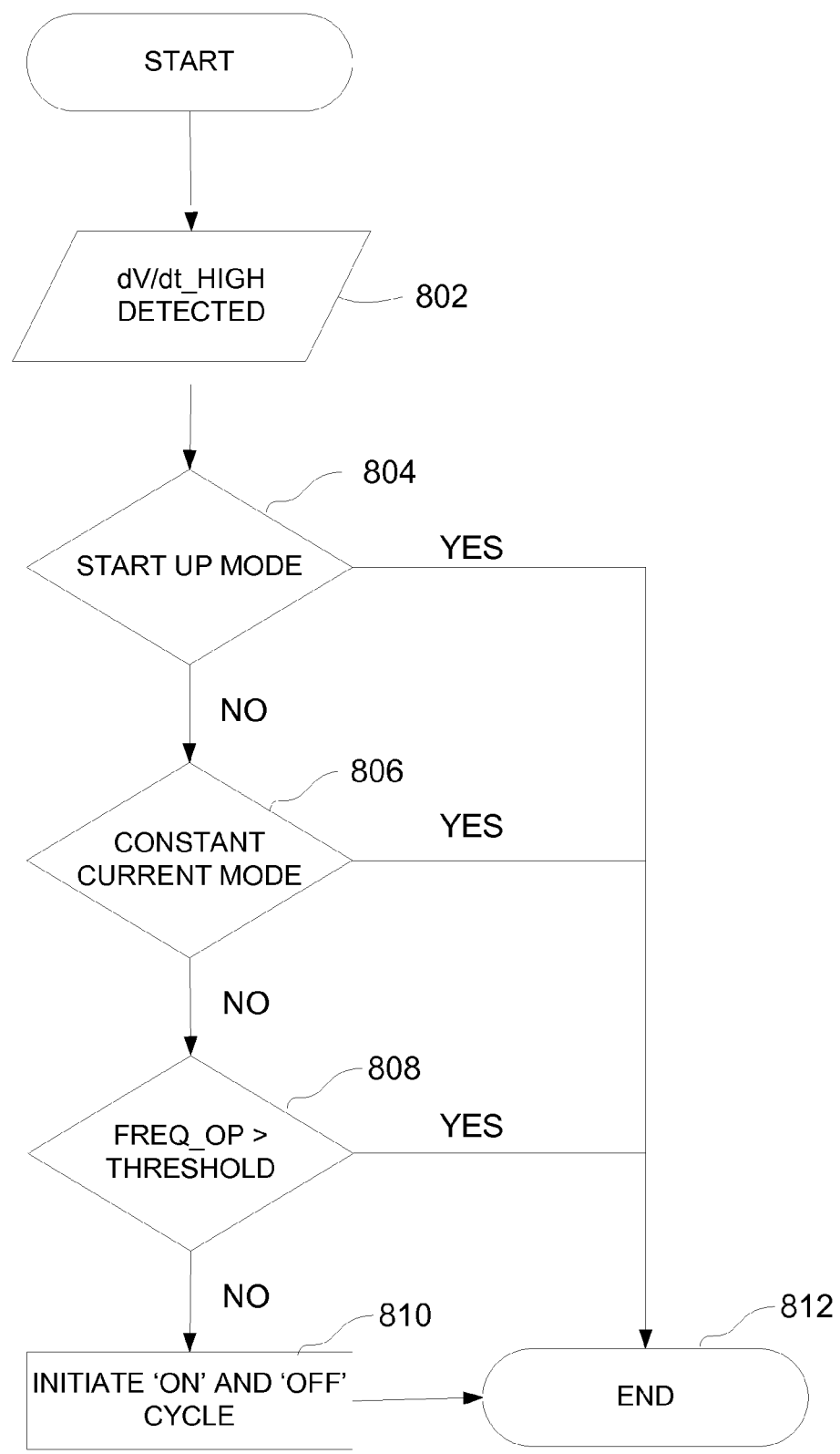
FIG. 8 is a flow diagram illustrating the operation of a primary-side controller of a switching power converter according to another embodiment.

FIG. 8 is a flow diagram illustrating one embodiment of the process in which controller 701 takes appropriate actions in response to receiving a detection signal 725 from secondary voltage detection circuit 704. Once a detection signal 725 has been received indicating a high rate of change (dV/dt) of the output voltage 703 exceeding the dV/dt_REF in step 802, controller 701 determines whether power converter 700 is operating in either the start-up mode (step 804) or in the CCM (step 806). If it has been determined that power supply 700 is operating in either the start-up mode or the CCM, controller 701 disregards the detection signal 725 received from secondary voltage detection circuit 704. Once controller 701 has determined that power supply 700 is in neither the start-up mode nor CCM, it further determines if the power supply is either in a no-load or light load condition in step 808. It is at no-load or light load operating conditions where the power supply 700 is most vulnerable to dynamic load conditions due to the long periods between "ON" and "OFF" cycles. Controller 701 uses the current operating frequency in order to determine if power supply 800 is in a no-load or light load operating condition. If power supply 700 is operating (FREQ_OP) above a minimum operating frequency threshold (THRESHOLD-indicating that the power supply is not in the no-load or light-load operating conditions), no special action is taken because the frequency of primary-side feedback signals is sufficient to provide normal response by the control loop and the process ends 812. If the operating frequency of power supply 700 is below the minimum operating frequency in step 808, the controller concludes that power supply 800 is operating in a no-load or light load condition and that output 803 voltage is in decline. At this point, controller 701 initiates an "ON" and "OFF" cycle in order to obtain a feedback signal representative of the output voltage. For the initial "ON" and "OFF" cycle, controller 701 may define a minimum energy cycle in order to prevent voltage overshoot. Termed a "sense-pulse" it provides the minimum energy transferred from the primary side to the secondary side of the switching power converter while providing a reliable feedback signal.

Figure 9:
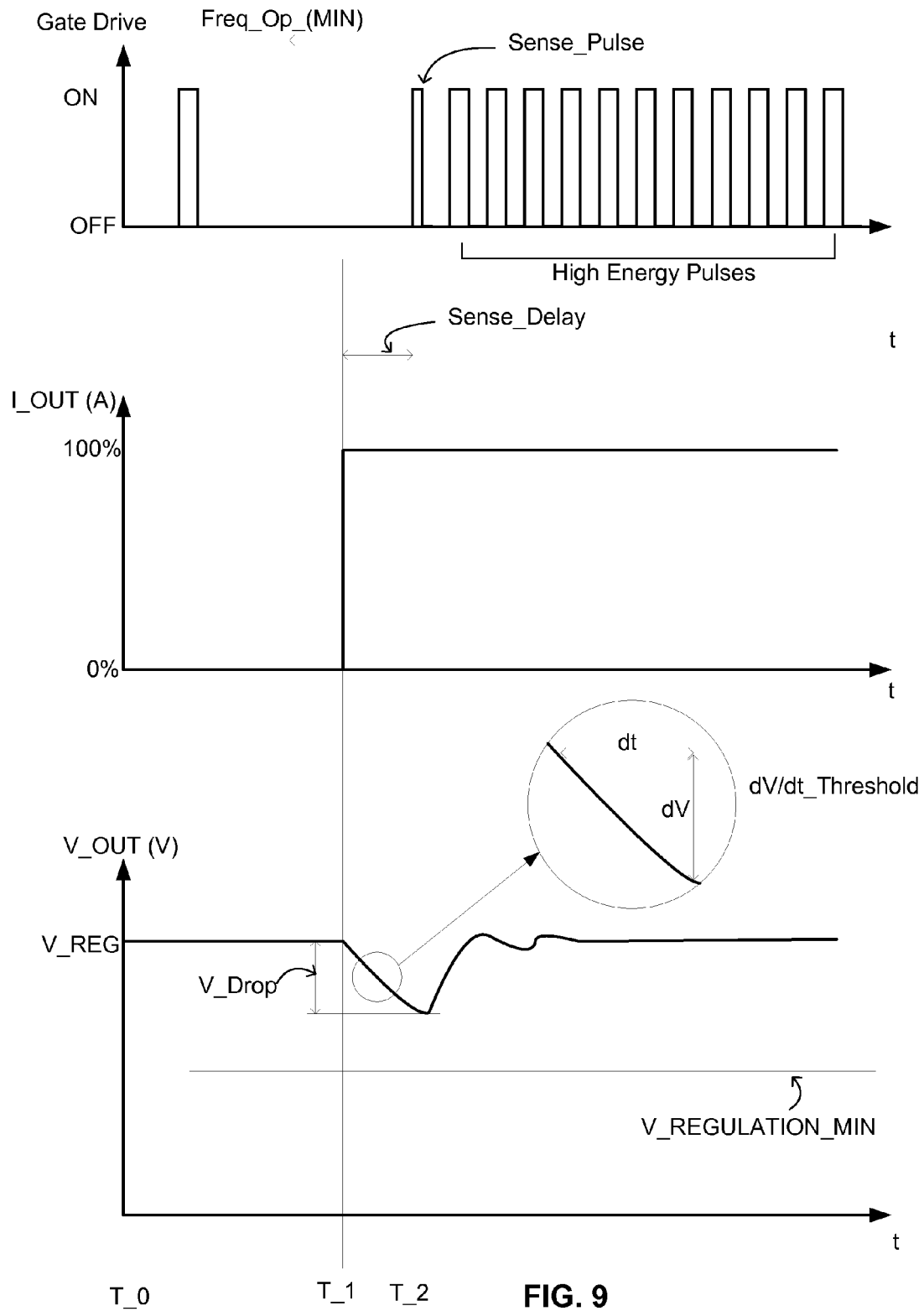
FIG. 9 illustrates the operating waveforms of a switching power converter with primary-side feedback according to another embodiment.

FIG. 9 illustrates the resulting operational waveforms where a power supply 700 is operating in a no-load condition at time T_0. At time T_1, a dynamic load from 0% to 100% rated load is placed on power supply 700. The dynamic load causes a drop in output voltage 703 until it triggers the dV/dt threshold (dV/dt_REF), as explained above with reference to FIGS. 7B and 7C. Secondary voltage detection circuit 704 generates dV/dt detection signal 725, which is received by controller 701. Once controller 701 determines that power supply 700 is operating in the constant voltage mode and that it is operating in a no-load or light load condition in step 808, it initiates a sense pulse in order to obtain a feedback signal representative of output voltage 703. Based on the feedback signal 711 obtained from the sense pulse, controller 701 determines that the load has indeed increased and controller initiates subsequent "ON" and "OFF" cycles necessary to maintain proper output voltage regulation.

Figure 10:
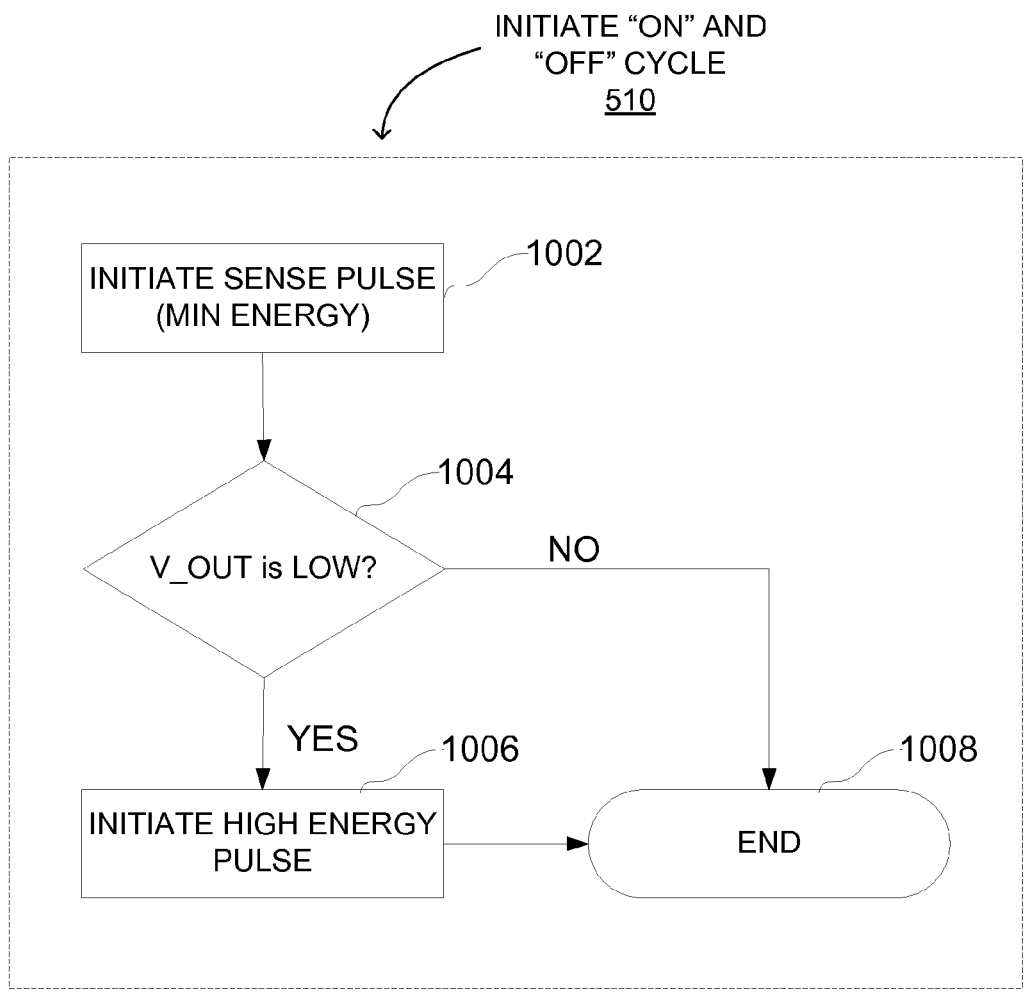
FIG. 10 is a flow diagram further illustrating the operation of a primary-side controller of a switching power converter according to one embodiment.

FIG. 10 is a flow diagram further illustrating one embodiment of the use of the sense pulse in order to obtain a feedback signal without causing voltage overshoot of output voltage 403/703. As described above with reference to FIGS. 4 and 7A, when a drop in the output voltage 403/703 is detected, the sense pulse is initiated 1002 to obtain a feedback signal representative of the output voltage 403/703. Here, the sense pulse is a minimum energy pulse transferred from the primary side to the secondary side of the switching power converter just enough to provide the feedback signal in the primary side representative of the output voltage 403/703. Alternatively, the sense pulse is an energy pulse that is smaller than the energy pulse used to regulate the output voltage of the switching power converter. If the feedback signal indicates that the output voltage 403/703 is too low (lower than a threshold), then high energy pulses are initiated 1006 as shown in FIGS. 6 and 9 to raise the output voltage to the normal regulated level. If the feedback signal indicates that the output voltage 403/703 is not too low (higher than a threshold), then no action is taken and process ends 1008.

Upon reading this disclosure, those of skill in the art will appreciate still additional alternative designs for a switching power converter capable of responding to dynamic load conditions. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention.

What is claimed is:

1. A switching power converter comprising:
   a transformer coupled between an input and an output of the switching power converter, the transformer including a primary winding coupled to the input to receive an input voltage and a secondary winding coupled to the output of the switching power converter;
   a switch coupled to the primary winding of the transformer, current through the primary winding being generated while the switch is turned on and not being generated while the switch is turned off;
   a controller at a primary winding side of the transformer and configured to generate a control signal to turn on or turn off the switch, the switch being turned on responsive to the control signal being in a first state and the switch being turned off responsive to the control signal being in a second state;
   a feedback circuit at the primary winding side of the transformer and configured to generate a feedback signal indicative of an output voltage at the output of the switching power converter;
   a load detection circuit at a secondary winding side of the transformer and separate from the feedback circuit, the load detection circuit configured to generate a detection signal responsive to the output voltage reaching a voltage condition; and
   wherein the controller is configured to:
      receive the detection signal indicative that the output voltage reached the voltage condition;
      responsive to determining that the output voltage reached the voltage condition due to a condition other than a dynamic load condition occurring when a load is connected to the output of the switching power converter, disregarding the detection signal; and
      responsive to determining that the output voltage did not reach the voltage condition due to the condition other than the dynamic load condition, determining that the output voltage reached the voltage condition due to the dynamic load condition.

2. The switching power converter of claim 1, wherein the controller is configured to turn on the switch earlier than scheduled by a regulation scheme employed by the switching power converter at a time the detection signal is received, responsive to determining that the detection signal is generated due to the dynamic load condition.

3. The switching power converter of claim 2, wherein the controller is configured to turn on the switch earlier than scheduled by outputting a sense pulse that transfers smaller amount of energy from the primary winding to the secondary winding of the transformer than is required by the regulation scheme employed by the switching power converter in order to obtain the feedback signal from the feedback circuit that is indicative of the output voltage at the output of the switching power converter.

4. The switching power converter of claim 3, wherein the controller is further configured to regulate the output voltage responsive to receiving the feedback signal generated by the feedback circuit in response to the sense pulse, the feedback signal indicative of the output voltage dropping below a threshold voltage.

5. The switching power converter of claim 1, wherein the other condition comprises a start up mode where the switching power converter is powering on and the controller is configured to disregard the detection signal responsive to determining that the detection signal is generated due to the switching power converter being in the start up mode.

6. The switching power converter of claim 1, wherein the other condition comprises a constant current mode where a substantially constant current is provided at the output of the switching power converter and the controller is configured to disregard the detection signal responsive to determining that the detection signal is generated due to the switching power converter being in the constant current mode.

7. The switching power converter of claim 1, wherein the other condition comprises a no-load or low load condition and the controller is configured to disregard the detection signal responsive to determining that the switching power converter is operating above a minimum operating frequency that is sufficient to regulate the output voltage during the no-load or the low load condition.

8. The switching power converter of claim 1, wherein the load detection circuit is configured to generate the detection signal responsive to the voltage condition of the output voltage dropping below a threshold voltage.

9. The switching power converter of claim 1, wherein the load detection circuit is configured to generate the detection signal responsive to the voltage condition of the output voltage decreasing at a rate of change greater than a threshold rate of change.

10. The switching power converter of claim 8, wherein the load detection circuit comprises:
    a comparator configured to compare the output voltage at the output of the switching power converter with a reference voltage to generate a drive signal when the output voltage reaches the voltage condition of dropping below the reference voltage; and
    a device configured to generate the detection signal indicative of the output voltage reaching the voltage condition of dropping below the reference voltage responsive to receiving the drive signal.

11. The switching power converter of claim 9, wherein the load detection circuit comprises:
    a rate of change detector circuit coupled to the output of the switching power converter and configured to generate a signal indicative of a rate of change of the output voltage;
    a comparator configured to compare the signal indicative of the rate of change of the output voltage with a reference rate of change of output voltage and configured to generate a drive signal when the output voltage decreases at a rate of change greater than the reference rate of change; and
    a device configured to generate the detection signal indicative of the output voltage reaching the voltage condition of decreasing at the rate of change greater than the reference rate of change.

12. In a controller, a method of controlling a switching power converter, the switching power converter including a transformer including a primary winding coupled to an input of the switching power converter and a secondary winding coupled to an output of the switching power converter, a switch coupled to the primary winding of the transformer, current through the primary winding being generated while the switch is turned on and not being generated while the switch is turned off, the switching power converter further including the controller at a primary winding side of the transformer, a feedback circuit at the primary winding side of the transformer and configured to generate a feedback signal indicative of an output voltage at the output of the switching power converter, and a load detection circuit at a secondary winding side of the transformer and separate from the feedback circuit, the load detection circuit configured to generate a detection signal responsive to the output voltage reaching a voltage condition, the method comprising:

generating a control signal to turn on or turn off the switch, the switch being turned on responsive to the control signal being in a first state and the switch being turned off responsive to the control signal being in a second state;

receiving the detection signal from the load detection circuit, the detection signal indicative that the output voltage reached the voltage condition;

responsive to determining that the output voltage reached the voltage condition due to a condition other than a dynamic load condition occurring when a load is connected to the output of the switching power converter, disregarding the detection signal; and responsive to determining that the output voltage did not reach the voltage condition due to the condition other than the dynamic load condition, determining that the output voltage reached the voltage condition due to the dynamic load condition.

13. The method of claim 12, further comprising:

turning on the switch earlier than scheduled by a regulation scheme employed by the switching power converter at a time the detection signal is received, responsive to determining that the detection signal is generated due to the dynamic load condition.

14. The method of claim 13, wherein turning on the switch comprises:

outputting a sense pulse that transfers smaller amount of energy from the primary winding to the secondary winding of the transformer than is required by the regulation scheme employed by the switching power converter in order to obtain the feedback signal from the feedback circuit that is indicative of the output voltage at the output of the switching power converter.

15. The method of claim 14, further comprising:

regulating the output voltage responsive to receiving the feedback signal generated by the feedback circuit in response to the sense pulse, the feedback signal indicative of the output voltage dropping below a threshold voltage.

16. The method of claim 12, wherein the other condition comprises a start up mode where the switching power converter is powering on and the method further comprises:

disregarding the detection signal responsive to determining that the detection signal is generated due to the switching power converter being in the start up mode.

17. The method of claim 12, wherein the other condition comprises a constant current mode where a substantially constant current is provided at the output of the switching power converter and the method further comprises:

disregarding the detection signal responsive to determining that the detection signal is generated due to the switching power converter being in the constant current mode.

18. The method of claim 12, wherein the other condition comprises a no-load or low load condition and the method further comprises:

disregarding the detection signal responsive to determining that the switching power converter is operating above a minimum operating frequency that is sufficient to regulate the output voltage during the no-load or the low load condition.

19. A switching power converter comprising:

a transformer coupled between an input and an output of the switching power converter, the transformer including a primary winding coupled to the input to receive an input voltage and a secondary winding coupled to the output of the switching power converter;

a switch coupled to the primary winding of the transformer, current through the primary winding being generated while the switch is turned on and not being generated while the switch is turned off;

a controller at a primary winding side of the transformer and configured to generate a control signal to turn on or turn off the switch, the switch being turned on responsive to the control signal being in a first state and the switch being turned off responsive to the control signal being in a second state;

a feedback circuit at the primary winding side of the transformer and configured to generate a feedback signal indicative of an output voltage at the output of the switching power converter;

a load detection circuit at a secondary winding side of the transformer and separate from the feedback circuit, the load detection circuit configured to generate a detection signal responsive to the output voltage reaching a condition; and wherein the controller is configured to:

receive the detection signal and determine whether the output voltage reached the condition due to a dynamic load condition occurring when a load is connected to the output of the switching power converter or another condition other than the dynamic load condition; and responsive to determining that the detection signal is generated due to the dynamic load condition, turn on the switch earlier than scheduled by a regulation scheme employed by the switching power converter at the time the detection signal is received by outputting a sense pulse that transfers a smaller amount of energy from the primary winding to the secondary winding of the transformer than is required by the regulation scheme employed by the switching power converter in order to obtain the feedback signal from the feedback circuit that is indicative of the output voltage at the output of the switching power converter.

20. In a controller, a method of controlling a switching power converter, the switching power converter including a transformer including a primary winding coupled to an input of the switching power converter and a secondary winding coupled to an output of the switching power converter, a switch coupled to the primary winding of the transformer, current through the primary winding being generated while the switch is turned on and not being generated while the switch is turned off, the switching power converter further including the controller at a primary winding side of the transformer, a feedback circuit at the primary winding side of the transformer and configured to generate a feedback signal indicative of an output voltage at the output of the switching power converter, and a load detection circuit at a secondary winding side of the transformer and separate from the feedback circuit, the load detection circuit configured to generate a detection signal responsive to the output voltage reaching a condition, the method comprising:

generating a control signal to turn on or turn off the switch, the switch being turned on responsive to the control signal being in a first state and the switch being turned off responsive to the control signal being in a second state;

receiving the detection signal from the load detection circuit;

determining whether the output voltage reached the condition due to a dynamic load condition occurring when a load is connected to the output of the switching power converter or another condition other than the dynamic load condition; and responsive to determining that the detection signal is generated due to the dynamic load condition, turning on the switch earlier than scheduled by a regulation scheme employed by the switching power converter at the time the detection signal is received by outputting a sense pulse that transfers a smaller amount of energy from the primary winding to the secondary winding of the transformer than is required by the regulation scheme employed by the switching power converter in order to obtain the feedback signal from the feedback circuit that is indicative of the output voltage at the output of the switching power converter.

* * * * *